(12) United States Patent
Sander

(10) Patent No.: US 8,018,651 B2
(45) Date of Patent: Sep. 13, 2011

(54) MICROSCOPE

(75) Inventor: Ulrich Sander, Rebstein (CH)

(73) Assignee: Leica Instruments (Singapore) Pte. Ltd., Singapore (SG)

(*) Notice: Subject to any disclaimer, the term of this patent is extended or adjusted under 35 U.S.C. 154(b) by 562 days.

(21) Appl. No.: 12/108,533

(22) Filed: Apr. 24, 2008

(65) Prior Publication Data

US 2008/0266656 A1 Oct. 30, 2008

(30) Foreign Application Priority Data

Apr. 24, 2007 (DE) .................. 10 2007 019 335

(51) Int. Cl.
*G02B 21/18* (2006.01)

(52) U.S. Cl. .................................................. 359/372
(58) Field of Classification Search .................. 359/368, 359/353, 373–378, 372
See application file for complete search history.

(56) References Cited

U.S. PATENT DOCUMENTS

| | | | |
|---|---|---|---|
| 6,061,176 A | 5/2000 | Shih | |
| 6,819,485 B2 | 11/2004 | Mannss | |
| 2004/0091259 A1* | 5/2004 | Hanzawa | ................ 396/534 |
| 2004/0227989 A1 | 11/2004 | Obrebski et al. | |
| 2005/0128287 A1* | 6/2005 | Hanzawa | ................ 348/42 |

* cited by examiner

*Primary Examiner* — Alessandro Amari
(74) *Attorney, Agent, or Firm* — Hodgson Russ LLP

(57) ABSTRACT

A microscope having a night vision apparatus, which apparatus can be impinged upon by beam paths proceeding from a specimen or object to be observed.

12 Claims, 4 Drawing Sheets

MICROSCOPE

CROSS REFERENCE TO RELATED APPLICATIONS

This application claims priority of German patent application 10 2007 019 335.3 filed Apr. 24, 2007, which is incorporated by reference herein.

FIELD OF THE INVENTION

The present invention relates to a microscope, in particular to a stereomicroscope.

BACKGROUND OF THE INVENTION

Conventional microscopes, e.g. surgical microscopes, comprise a permanently incorporated illumination system with which a specimen or object to be viewed is illuminated. The illumination system can be embodied as a reflected-light and/or transmitted-light system.

Highly sensitive specimens exist, however, that can be damaged by visible light, UV light, or even IR light. An example that may be given here is the human eye that is being viewed by means of a microscope in the context of an ophthalmic operation.

The present invention strives to make available a microscope, in particular a surgical microscope, in which damage to the specimen being observed as a result of the light used for illumination of the specimen is minimized or entirely avoided.

A microscope having the features of claim 1 is proposed for this purpose.

With a microscope according to the present invention, the light intensity necessary for observation or for sufficient illumination of a specimen can be significantly reduced as compared with conventional solutions. Night vision apparatuses usable according to the present invention are available relatively economically. The solution according to the present invention makes a significant contribution toward reducing stress on light-sensitive specimens that are being examined under a microscope. The solution according to the present invention is moreover physically small and compact, so that it is readily usable for numerous applications. In particular, night vision device can advantageously be integrated into the microscope housing.

A night vision apparatus can be introduced into the normal beam path of a microscope, i.e. for example positioned on an optical axis defined by a main objective and/or a zoom system. It is likewise possible to couple out additional beam paths for a night vision apparatus. A beam path coupled out in this fashion can be delivered to a suitably positioned night vision apparatus. An image generated by means of the night vision apparatus can then be displayed on a monitor. It is likewise conceivable to superimpose the image generated by the night vision apparatus back onto the normal beam path of the microscope. Depending on the superimposition location, a magnification generated in the normal beam path must be compensated for in the image provided by the night vision apparatus.

The microscope is embodied in particular as a stereomicroscope. The invention proves advantageous in particular in connection with the stereoscopic viewing of a specimen, since good stereoscopic observation is possible here even with very dim or weak light.

Advantageous embodiments of the microscope according to the present invention are the subject matter of the dependent claims.

Stereomicroscopes of this kind are usable in particularly advantageous fashion as surgical microscopes.

In this connection, reference may be made to the following: In principle, any number of night vision apparatuses can be provided for a microscope according to the present invention. For example, two night vision devices can be provided for a stereomicroscope. These night vision apparatuses can be introduced into the respective stereoscopic observation channels, or can be impinged upon by further beam paths proceeding from a specimen to be observed.

It is likewise possible to provide only a single night vision apparatus for a number of beam paths, for example for both normal observation beam paths of a stereomicroscope, and to obtain images sequentially, for example by means of a suitable time-related control system, for the respective beam paths or observation channels. Images acquired shortly after one another (sequentially) can be viewed stereoscopically, without substantial degradation or perceptible time delay for an observer, by being presented, for example, on an autostereoscopic display or on a display having polarization display means.

According to a preferred embodiment of the invention, the night vision apparatus is placed downstream and/or upstream from a zoom system of the microscope. An upstream positioning, i.e. for example between the main objective and zoom system of a microscope, proves particularly advantageous, since no attenuation of the limited spectral range that is typically essential for a night vision apparatus occurs as a result of the optical properties of the zoom system (absorption or light attenuation). A superimposition of the image generated by the night vision apparatus with the normal observation beam paths of the microscope can likewise occur before and/or after the zoom system.

A superimposition of the image generated with the night vision apparatus onto the normal beam path or paths of the microscope is, as mentioned, advantageous. Usefully provided for this purpose is a superimposition device with which an image generated by a night vision apparatus can be superimposed onto a normal beam path of the microscope. With such a superimposition, a high-contrast image can be generated in particular in dim light conditions. It is possible in this connection, for example, to electronically process images generated by the one or more night vision devices. Edge emphasis or intensification, as well as color modification or color coding, may be mentioned here by way of example. The term "normal" beam paths refers here to beam paths that do not impinge on the night vision device, but instead pass through the usual components of a microscope, namely e.g. the main objective, zoom system, eyepiece, etc.

Usefully, a superimposition device of this kind comprises means for magnifying or enlarging an image generated by the night vision apparatus. With such means it is possible to introduce the image generated by the night vision apparatus back into the normal beam path even after a magnification system, for example the zoom system.

According to a preferred embodiment of the microscope according to the present invention, generation of a respective image by way of respective night vision apparatuses occurs for two observation channels of a stereomicroscope, the generated images being inputted into a connected computer or one integrated into the microscope and presented stereoscopically on a screen. This feature permits additional or alternative viewing, on the screen, of a specimen to be observed.

It proves advantageous to provide at least one shutter that is extendable into and retractable from the beam paths. With such shutters, a user of the microscope can, for example, select or switch back and forth between a direct observation of the image through the observation channel or channels of the microscope and an image generated by a night vision apparatus, presented on a monitor, and reflected into the observation channel or channels of the microscope. A superimposed observation of these two aforesaid images can also be implemented with appropriate positioning of the shutters or shutter elements.

According to a further preferred embodiment of the microscope according to the present invention, an illumination device can be selectably switched in. An illumination device of this kind can, for example, be switched in for the observation of non-sensitive specimens. An illumination device of this kind can also be quickly switched on, for example, in an emergency. When an illumination device is switched on, an automatic switching off of the respectively provided night vision apparatuses is also conceivable.

According to a further preferred embodiment of the microscope according to the present invention, deflection elements having a variable reflectivity or transmissivity, which can be impinged upon by the respective beam paths, are provided. The concept of "variability" is also intended to encompass the possibility of displacing a beam splitter entirely out of a beam path. This would thus mean a decrease in reflectivity to zero. Stepless variability is also, however, intended to be encompassed in the same fashion. Stepless variability is achievable, for example, by means of micromirror arrays that are usable selectably as fully reflective mirrors, partially transparent, or semitransparent mirrors (beam splitters), or even as entirely transmissive elements.

The invention and its advantages will be further explained below with reference to exemplifying embodiments that are illustrated in the appended drawings. It is understood that the features of the invention discussed and yet to be discussed are usable not only in the respective combination indicated, but also in other combinations or in isolation, without departing from the context of the present invention. Different embodiments are also, in particular, partially or completely combinable.

BRIEF DESCRIPTION OF THE DRAWINGS

The invention will now be explained further with reference to the appended drawings, in which.

DETAILED DESCRIPTION OF THE INVENTION

Figure 1:
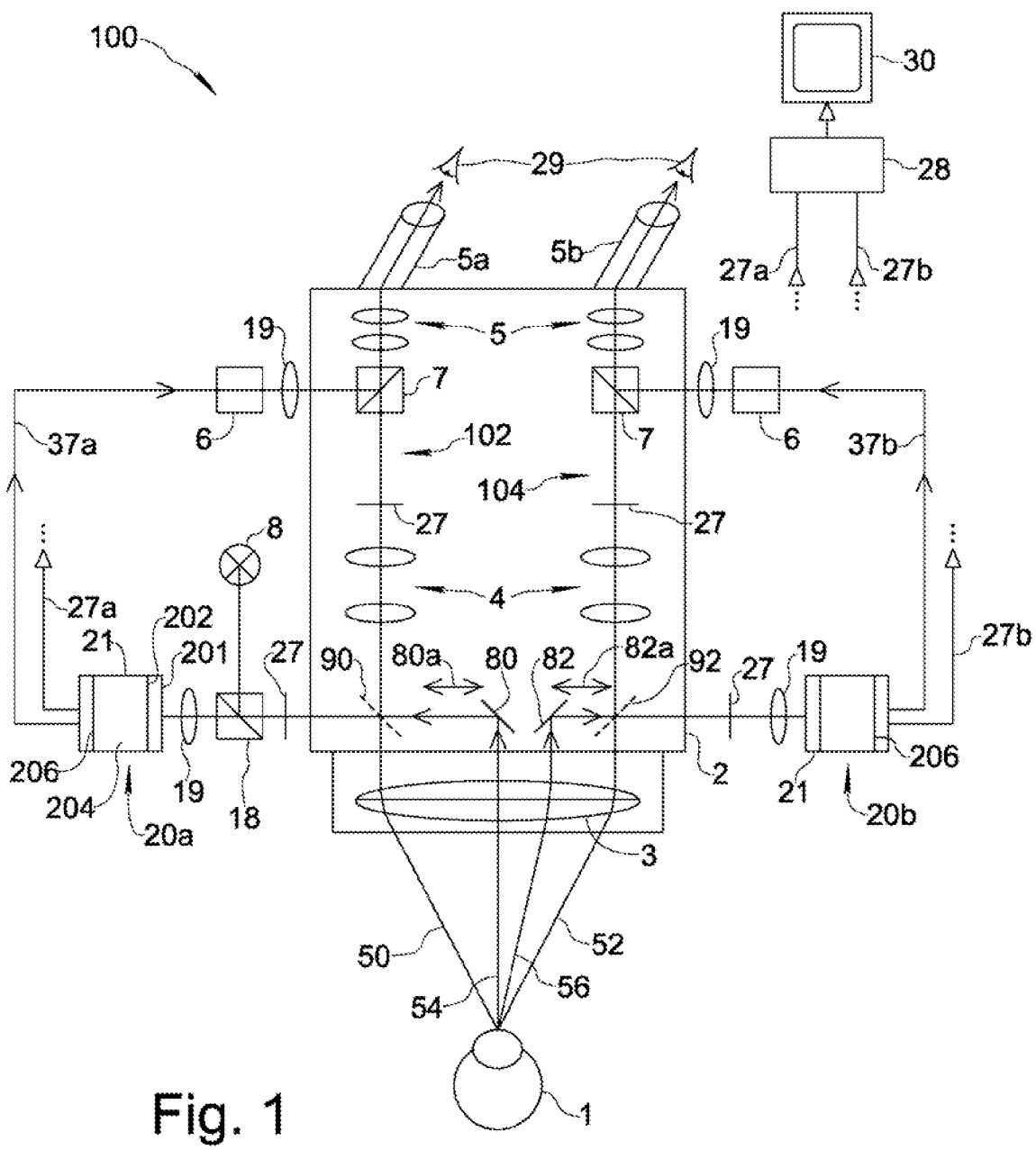
FIG. 1 is a schematic side view of a first preferred embodiment of a microscope according to the present invention.

The microscope depicted in FIG. 1 is embodied as a stereomicroscope and labeled 100 in its entirety. Stereomicroscope 100 serves, in the example depicted, as a surgical microscope for observing an eye 1 of a patient. Stereomicroscope 100 comprises two observation channels 102, 104 in order to enable stereoscopic observation of eye 1 by a user 29.

Beam paths 50, 52, 54, 56 emerging from eye 1 first strike a main objective 3. Observation channels 102, 104 are arranged behind main objective 3 as viewed from the observed specimen or eye 1, so that beam path 50 proceeds through observation channel 102, and beam path 52 through observation channel 104. Observations channels 102, 104 proceed through a zoom system 4 configured with two channels, and through a binocular tube 5. Zoom system 4 and binocular tube 5 each comprise a number of lenses. Binocular tube 5 is embodied in the usual way with eyepieces 5a, 5b.

Main objective 3, zoom system 4, and binocular tube 5 are arranged in a microscope housing 2.

Observer 29, in particular a surgeon, can stereoscopically observe eye 1 by observing beam paths 50, 52 that, as mentioned, proceed through main objective 3, zoom system 4, binocular tube 5, and eyepieces 5a, 5b.

The stereomicroscope depicted in FIG. 1 comprises two night vision apparatuses 20a, 20b. By means of these night vision apparatuses 20a, 20b, an observation of eye 1 is possible even in poor viewing conditions or with dim or absent illumination, as will be explained below.

Further beam paths 54, 56 emerging from eye 1 strike deflection elements 80 and 82, respectively after passing through main objective 3 in microscope housing 2. Beam path 54 is directed via deflection element 80, which is preferably provided as a mirror, into first night vision apparatus 20a. Embodied between deflection element 80 and night vision apparatus 20a are a beam splitter element 18 and an imaging system 19 (depicted for the sake of simplicity as a lens). The function of beam splitter element 18 will be explained below. Night vision apparatus 20a comprises, in a manner known per se, a low-light amplifier 21. In this, light (i.e. beam path 54) striking a photocathode 202 on, for example, entry side 201 triggers electrons that, accelerated by a high voltage in a vacuum 204, strike a luminous screen 206 on the opposite side and there generate an image.

Be it noted that the embodiment of a night vision device or low-light amplifier in the manner just described represents only one of several preferred embodiments. It is additionally possible to use, as night vision apparatuses, CCD or CMOS image sensors that, for example, respond to IR radiation of certain wavelengths or to another suitable wavelength region (e.g. UV region). Utilization of such image sensors, which are also used in conventional digital cameras or digital film cameras, proves to be particularly compact.

Analogously thereto, second night vision apparatus 20b is impinged upon by the further beam path 56 emerging from the eye, which path is deflected by a further deflection element 82. An imaging system (once again depicted in simplified fashion as a lens) is likewise provided between deflection element 82, likewise preferably embodied as a mirror, and second night vision apparatus 20b.

Second night vision apparatus 20b, analogously to the first, likewise comprises a low-light amplifier 21. Second night vision apparatus 20b analogously generates an image on a luminous screen 206.

According to a first preferred embodiment, the images generated by the two night vision apparatuses 20a, 20b can be digitized and delivered via conductors 27a, 27b to a computer 28, where they are processable to yield a stereoscopic image that can be presented on a monitor 30.

Alternatively or in addition to an observation via observation channels 102, 104 of the microscope, observer 29 can thus stereoscopically view, on monitor 30, eye 1 that is to be observed.

Alternatively or in addition to this stereoscopic image processing in computer 28, the images generated by the two night vision apparatuses 20a, 20b can also be reflected into observation channels 102, 104. This makes possible a superimposition of the images produced in observation channels 102, 104 and the images generated by the night vision apparatuses.

Advantageously, this superimposition is accomplished by means of superimposition devices 6, 7 to which the respective signals and images of night vision apparatuses 20a, 20b are delivered via conductors 37a, 37b. These superimposition devices each comprise an image processing device 6 and a semitransparent mirror 7 positioned in observation channels 102, 104 or beam paths 50, 52. Image processing devices 6 each comprise a presenting display that transfer the respective images to be presented, via further imaging systems 19 (once again depicted as a lens) onto semitransparent mirror 7. Because this superimposition occurs behind zoom system 4 as viewed from objective 1 or main objective 3, the actual magnification experienced by beam paths 50, 52 as a result of the zoom system must be taken into account in image processing devices 6. For this purpose, zoom system 4 comprises sensors that sense the current magnification of the zoom system and transfer it to image processing devices 6.

It is further evident from FIG. 1 that the observation angles of beam paths 50 and 54, and 52 and 56, are different in each case. Because these beam paths, or images generated from them, are superimposed on one another in superimposition devices 6, 7, these angle differences or position differences are usefully also compensated for in image processing devices 6.

There are several possibilities in this context: For example, it is conceivable to minimize the angles between beam paths 50 and 54, and 52 and 56 as much as possible in order to minimize the distances between the respective deflection elements and the beam paths 50, 52 proceeding through the zoom system. For this purpose, deflection devices 80, 82 can also be embodied displaceably perpendicular to the beam paths 50, 52 proceeding through the zoom system, as indicated by double arrows 80a, 82a.

It is likewise advantageously possible to reflect the images generated by night vision apparatuses 20a, 20b into beam paths 50, 52 below the zoom system, i.e. for example between main objective 3 and zoom system 4. In this case, computational compensation for the magnification of zoom system 4 can be omitted.

A further possibility for the positioning of deflection elements or beam splitter devices for selective impingement upon observation channels 102, 104 and/or night vision devices 20a, 20b is depicted with dashed lines in FIG. 1 and labeled 90, 92.

This involves beam splitter elements 90, 92 that are introducible into observation channels 102, 104 in order to make available a beam path through observation channels 102, 104 and/or an impingement upon night vision devices 20a, 20b. Beam splitter elements 90, 92 are provided, for example, as semitransparent mirrors that split beam paths 50 and 52 into partial beam paths through zoom system 4 and night vision apparatuses 20a, 20b respectively. A solution of this kind has the advantage, as compared with the provision of mirrors 80, 82, that the observation angle for the beam paths through the zoom system and through night vision apparatuses 20a, 20b is the same in each case, so that computational compensation for different observation angles, for example in image processing device 6, is not necessary.

Beam splitter elements 90, 92 can furthermore also be embodied, for example, as micromirror arrays whose individual micromirrors are positionable so that both complete reflectivity and complete transmissivity of beam splitter elements 90, 92 can be established. With complete reflectivity, beam paths 50, 52 are deflected in their entirety into the respective night vision devices 20a, 20b. With complete transmissivity, beam paths 50, 52 are directed completely into zoom system 4 and into the optical components subsequent thereto It is likewise conceivable to provide deflection elements 80, 82 as well as beam splitter elements 90, 92 together in a microscope, and use them alternatively or also simultaneously.

Figure 2:
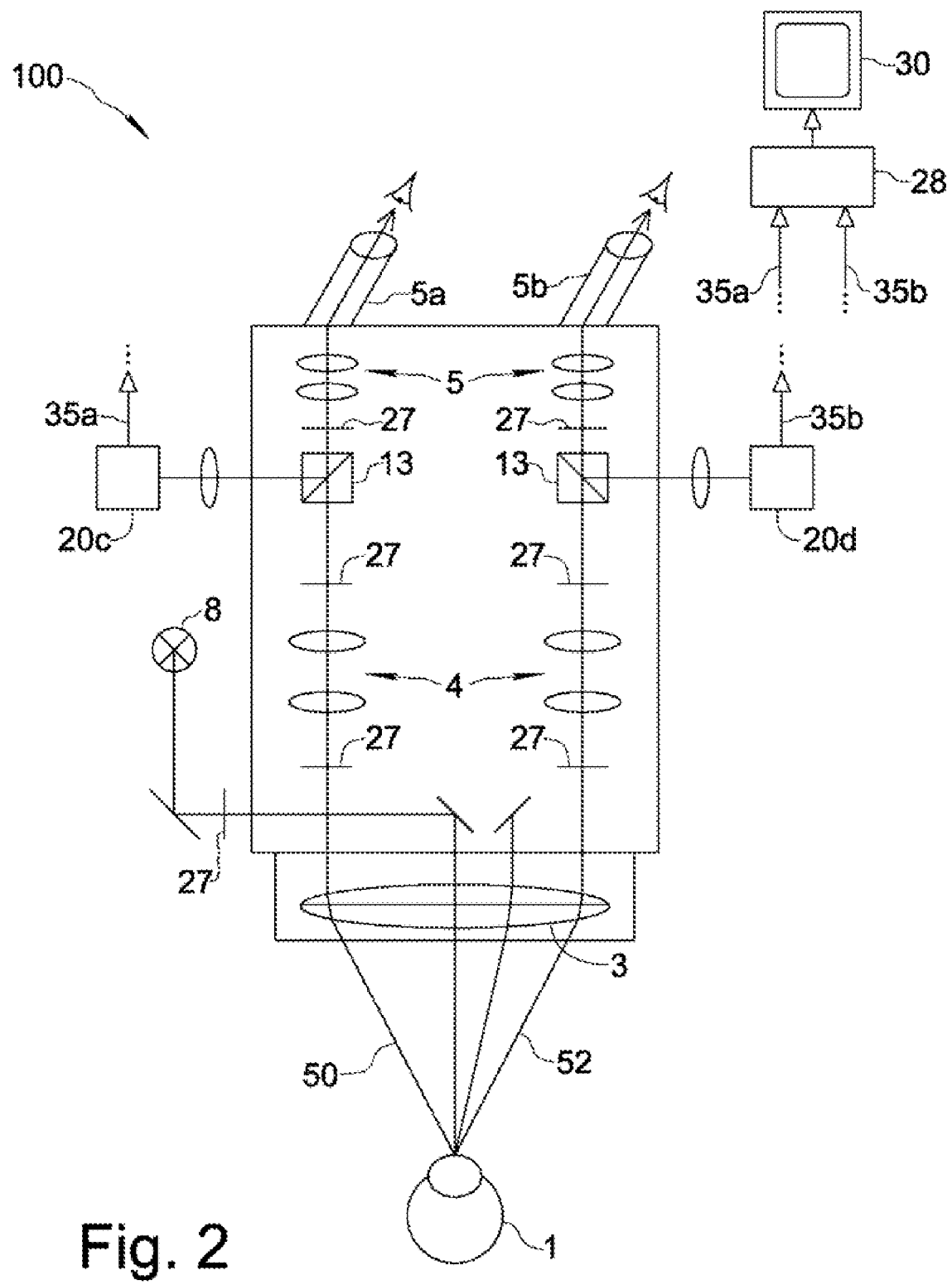
FIG. 2 is a schematic side view of a second preferred embodiment of a microscope according to the present invention.

FIG. 2 depicts a further preferred possibility for positioning the night vision apparatuses. By means of beam splitters 13, for example semitransparent mirrors, that are provided behind zoom system 4 (i.e. between zoom system 4 and binocular tube 5), portions of beam paths 50, 52 are deflected and delivered to night vision apparatuses 20c, 20d, respectively. The latter function analogously to night vision apparatuses 20a, 20b, and make a suitable image available to computer 28 via conductors 35a, 35b. As explained above with reference to FIG. 1, these images can be processed in computer 28 to yield a stereoscopic image. These images could, however, also be coupled back into observation channels 102, 104 above zoom system 4, i.e. for example between beam splitter 13 and binocular tube 5.

The effort made with the present invention is to keep to a minimum any illumination of specimen 1 being observed, or ideally to dispense entirely with illumination of the specimen.

An illumination apparatus 8 depicted in FIGS. 1 and 2 is therefore provided merely optionally. This illumination device 8 can be switched in such a fashion that a minimal illumination for the operation of night vision apparatuses 20a to 20d is made available. For example, illumination device 8 can encompass an infrared lamp that makes available a minimal infrared light intensity for reasonable or expedient operation of night vision apparatuses 20a to 20d.

Illumination device 8 can also comprise conventional illumination means that can be immediately switched on, for example, in an emergency situation.

Illumination device 8 is depicted in the exemplifying embodiments of FIGS. 1, 2 as an incident-light apparatus. For certain applications, e.g. observation of at least partially transparent or semitransparent specimens, it would likewise be conceivable to provide a corresponding transmitted-light illumination device additionally or alternatively thereto.

It proves to be advantageous to embody illumination device 8 with a dimmer function. With this dimmer function, the quantity of light can be optimally and steplessly adjusted even for very sensitive specimens. Spectrally selective elements are also advantageously usable in the context of illumination device 8, for example to reduce visible light with a simultaneous relative elevation in the IR component.

It is evident from FIG. 1 that beam splitter element 18 and deflection element 80 possess a dual function. On the one hand they serve to reflect in light from illumination device 8 onto the specimen or eye 1. On the other hand, they serve to deflect beam path 54 onto night vision apparatus 20a. Beam path 54 is thus largely identical to the beam path of illumination device 8. A very compact configuration of the night vision apparatuses and of illumination device 8 in a microscope can thereby be achieved.

Be it noted in this connection that as shown in FIGS. 1 and 2, the night vision apparatuses and the illumination device are not depicted as being arranged inside microscope housing 2. This serves merely to make the depiction illustrative, however. The aforesaid components can be arranged both inside and outside microscope housing 2. The same applies to image processing devices 6 and/or to computer 28 and/or to monitor 30.

Stereomicroscope 100 as shown preferably comprises closing apparatuses 28 with which the beam paths can selectably be interrupted depending on observation preference. Closing apparatuses 27 can be controllably shifted into and out of the respective beam paths by a user. Be it noted that the number and positioning of closing apparatuses 27 indicated in the Figures is selected solely by way of example. Depending on the application or requirements, more or fewer closing apparatuses can be provided at suitable positions.

Figure 3:
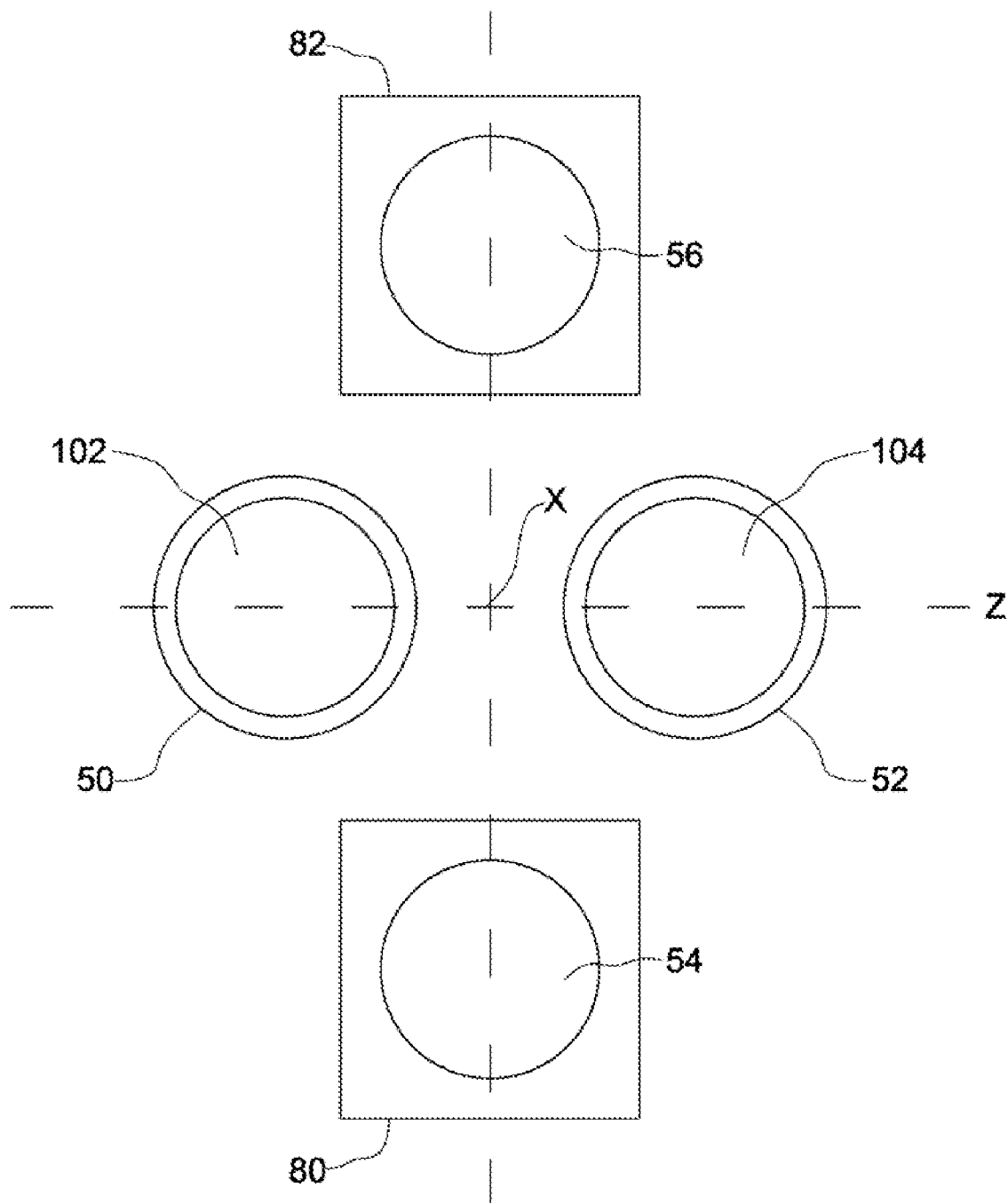
FIG. 3 is a schematically simplified plan view of a preferred arrangement of the observation channels or beam paths explained according to FIG. 1.

FIG. 3 depicts in plan view a preferred arrangement of beam paths 50, 52 and respective observation channels 102, 104, and of beam paths 54, 56 and respective deflection elements 80, 82, in a schematic sectioned view.

As is evident, observation channels 102, 104 and deflection elements 80, 82 are arranged in a cross shape around a center axis X. Referring to FIG. 1, this means in illustrative terms that deflection element 82 is rotated into drawing plane Z of FIG. 1, and deflection element 80 is rotated out of drawing plane Z. This action makes it possible to match the angle enclosed by beam paths 50, 52 extending through observation channels 102, 104 to the angle enclosed by beam paths 54, 56 that impinge upon deflection elements 80, 82. This measure makes it possible to minimize the computational effort to be expended, for example in image processing devices 6, in order to equalize or compensate for the different observation angles of light beams 50, 52, 54, 56. A respective computational 90-degree rotation of the images obtained by night vision apparatuses 20a, 20b is usefully performed in this context. With a 90-degree rotation of this kind and with angles of equal size between light beams 50, 52 and 54, 56, the computational effort for image processing is very small.

The possibility of using micromirror arrays for beam splitter elements 90, 92 was discussed with reference to FIG. 1. Be it noted that all the other beam splitter elements mentioned in the present application, i.e. for example beam splitter elements 18, 7 in FIGS. 1 and 13 in FIG. 2, can also be embodied as micromirror arrays. It is furthermore conceivable to configure the aforesaid beam splitter elements to be selectably extendable into and retractable from the respective beam paths. In combination with the respective shutter elements 27, a plurality of beam path combinations and variations is thus made available for optimizing a specimen observation depending on specific conditions.

Be it noted that beam splitter elements 90, 92, 18, 7, 13 embodied as micromirror arrays can also serve as shutters. For example, a beam splitter element 90 embodied as a micromirror array could, with appropriate positioning of the micromirrors, cause beam path 54 to be deflected by mirrors 80 into night vision device 20a, and simultaneously cause beam path 50 to be completely blocked. With this setting and with a corresponding setting of beam splitter element 92, an observation of specimen 1 based only on the images made available by night vision apparatuses 20a, 20b would be made available to user 29. In this case, for example, shutters 27 positioned in observation channels 102, 104 could be omitted. On the other hand, a corresponding complete introduction of beam paths 50, 52 into observation channels 102, 104 by appropriate positioning of the beam splitter elements embodied as micromirror arrays 90, 92 would allow, for example, shutters 27 placed ahead of the respective night vision devices 20a, 20b to be omitted.

Figure 4:
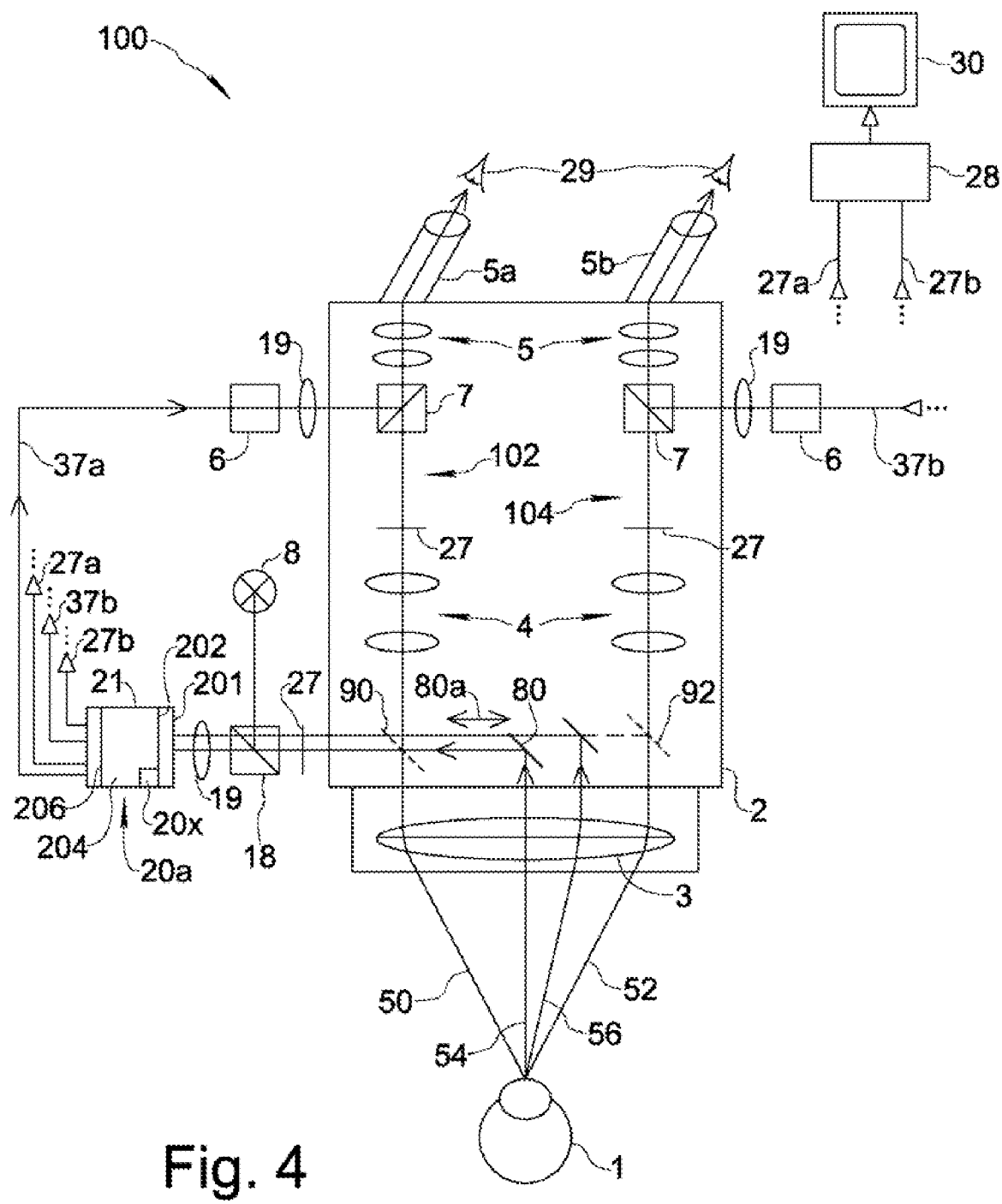
FIG. 4 a schematic side view of a third preferred embodiment of a microscope according to the present invention.

The microscope as depicted in FIG. 4 essentially corresponds to the microscope depicted in FIG. 1. Like components and features are designated with like reference numerals.

According to the microscope as shown in FIG. 4, only one night vision apparatus 20a is provided for the observation beam paths 54, 56.

Reflection elements 80 and 82 are both positioned in order to direct beam path 54, 56 into the night vision apparatus 20a.

Thus, a second night vision apparatus, as was used according to the embodiment as shown in FIG. 1, is not necessary according to this embodiment.

In the embodiment according to FIG. 4, the night vision apparatus 28 includes a time-related control system 20x, by means of which the beams 54, 56 can be processed sequentially, in order obtain corresponding sequential images for the respective beam paths for observation channels 54, 56.

Such images acquired shortly after one another (sequentially) can be viewed stereoscopically by being presented, for example, on an autostereoscopic display or on a display having polarization display means.

To achieve this, analogously to the first embodiment as shown in FIG. 1, images generated by the night vision apparatus 20a can be digitized and delivered by conductors 27a, 27b to a computer 28, where they are processable to provide a stereoscopic image that can be presented on a monitor 30.

Alternatively or in addition to this stereoscopic image processing in computer 28, the images generated by night vision apparatus 20a can also be reflected into observation channels 102, 104. This makes possible a superposition of the images produced in observation channels 102, 104 and the images generated by the night vision apparatus 20a.

Advantageously, this superposition is accomplished by means of superposition devices 6, 7 to which the respective signals and images of night vision apparatus 20a are delivered via conductors 37a, 37b. For a further description of these superposition devices, it is referred to the description of the embodiment according to FIG. 1.

It is also possible, analogously to the embodiment of FIG. 1, to use beam splitter elements 90, 92 in the embodiment of FIG. 4 in order to make the observation angles of beam paths through the zoom system correspond to those through the night vision apparatus.

PARTS LIST

1 Specimen/object (eye)
2 Housing
3 Main objective
4 Zoom system
5 Binocular tube
5a, 5b Eyepieces
6 Image processing device
7 Semitransparent mirror
8 Illumination device
13 Beam splitter (semitransparent mirror)
18 Beam splitter
19 Imaging system
20a, 20b, 20c, 20d Night vision apparatuses
20x Control system
21 Low-light amplifier
27 Closing apparatuses (shutters)
27a, 27b Conductors
28 Computer
29 Observer (user)
30 Monitor
35a, 35b Conductors
37a, 37b Conductors
50, 52, 54, 56 Beam paths
80, 82 Deflection elements
80a, 82a Double arrows 90, 92 Beam splitter elements (semitransparent mirrors, micromirror arrays)
100 Stereomicroscope
102, 104 Observation channels
201 Entry side
202 Photocathode
204 Vacuum
206 Luminous screen

What is claimed is:

1. A microscope for observing an object, the microscope comprising:
   a first beam path proceeding from the object;
   a night vision apparatus impinged upon by the first beam path;
   a zoom system in the first beam path;
   a second beam path proceeding from the object that does not impinge upon the night vision apparatus; and
   a superimposition device for superimposing an image generated by the night vision apparatus onto the second beam path.

2. The microscope according to claim 1, wherein the microscope is a surgical microscope.

3. The microscope according to claim 1, wherein the night vision apparatus is located downstream from the zoom system.

4. The microscope according to claim 1, wherein the night vision apparatus is located upstream from the zoom system.

5. The microscope according to claim 1, further comprising a shutter selectively operable to block the first beam path.

6. The microscope according to claim 1, further comprising an illumination device that can be selectively switched in to illuminate the object.

7. The microscope according to claim 1, further comprising at least one deflection element or beam splitter element impinged upon by the first beam path, the at least one deflection element or beam splitter element having a variable reflectivity or transmissivity.

8. The microscope according to claim 1, wherein the superimposition device is located upstream from the zoom system.

9. The microscope according to claim 1, wherein the superimposition device is located downstream from the zoom system.

10. The microscope according to claim 1, wherein the superimposition device includes an image processing device operable to magnify the image generated by the night vision apparatus.

11. The microscope according to claim 1, further comprising a first shutter selectively operable to block the first beam path and a second shutter selectively operable to block the second beam path.

12. The microscope according to claim 1, further comprising at least one deflection element or beam splitter element impinged upon by at least one of the first beam path and the second beam path, the at least one deflection element or beam splitter element having a variable reflectivity or transmissivity.

* * * * *